US011481559B1

(12) United States Patent  
Asefi et al.

(10) Patent No.: US 11,481,559 B1  
(45) Date of Patent: Oct. 25, 2022

(54) ARTIFICIAL INTELLIGENCE NATURAL LANGUAGE PROCESSING PLATFORM

(71) Applicant: Wells Fargo Bank, N.A., San Francisco, CA (US)

(72) Inventors: Azita Asefi, Vacaville, CA (US); Suhas D. Sankolli, Charlotte, NC (US); Senthil K. Subramaniam, San Ramon, CA (US); Alexander Davakis, Ormond Beach, FL (US); Rupali S. Shah, San Jose, CA (US); Alan W. Hecht, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 227 days.

(21) Appl. No.: 16/716,335

(22) Filed: Dec. 16, 2019

Related U.S. Application Data

(60) Provisional application No. 62/783,325, filed on Dec. 21, 2018.

(51) Int. Cl.
*G06F 40/30* (2020.01)
*G06F 40/247* (2020.01)
*G06F 40/295* (2020.01)
*G06F 9/54* (2006.01)

(52) U.S. Cl.
CPC .............. *G06F 40/30* (2020.01); *G06F 9/543* (2013.01); *G06F 40/247* (2020.01); *G06F 40/295* (2020.01)

(58) Field of Classification Search
None
See application file for complete search history.

(56) References Cited

U.S. PATENT DOCUMENTS

| 2019/0166069 A1* | 5/2019 | Yao ........................ G06F 3/0486 |
| 2020/0210649 A1* | 7/2020 | Lewis ...................... G06F 40/20 |
| 2021/0350209 A1* | 11/2021 | Wang ................... G06F 16/3344 |

OTHER PUBLICATIONS

Mukherjee, Subhabrata, and Sachindra Joshi. "Help yourself: a virtual self-assist system." In Proceedings of the 23rd International Conference on World Wide Web, pp. 171-174. 2014. (Year: 2014).*

Sahay, Saurav, Shachi H. Kumar, Eda Okur, Haroon Syed, and Lama Nachman. "Modeling intent, dialog policies and response adaptation for goal-oriented interactions." arXiv preprint arXiv:1912.10130 (2019). (Year: 2019).*

* cited by examiner

*Primary Examiner* — Frank D Mills
(74) *Attorney, Agent, or Firm* — Schwegman Lundberg & Woessner, P.A.

(57) ABSTRACT

Systems and techniques for an artificial intelligence natural language processing platform are described herein. A first dialogue configuration ruleset may be obtained for a first intent for a first entity. First user input may be received that includes a first text string from a chatbot session. The first intent may be identified from the chatbot session through evaluation of the first text string by a natural language processing engine using the first dialogue configuration ruleset. A dialogue stack may be generated for the chatbot session that includes a first state based on the first dialogue configuration ruleset. A first response to the first user input may be displayed based on the first dialogue configuration ruleset. The dialogue stack may be updated based on the first response.

18 Claims, 6 Drawing Sheets

BOT CONSOLE

← → ⟳ | BOT_CONSOLE.EXAMPLEWEBSITE.COM

API DEFINITIONS

[ADD API]

| API NAME | DESCRIPTION | | ACTIONS |
|---|---|---|---|
| EXAMPLE_ACCOUNT | API DESCRIPTION | | [DEACTIVATE] [EDIT] |

ADD API

API NAME
[EXAMPLE_ACCOUNT_API]

API DESCRIPTION
[EXAMPLE DESCRIPTION]

SERVICE PROVIDER
[EXAMPLE DESCRIPTION]

REQUEST PARAMETERS
[ADD PARAM]
[ADD]

RESPONSE BODY
[ { "SAMPLE" : { "TYPE" : "ACCOUNT", .............. ]

[CANCEL] [SAVE]

ARTIFICIAL INTELLIGENCE NATURAL LANGUAGE PROCESSING PLATFORM

CROSS-REFERENCE TO RELATED APPLICATION

This patent application claims the benefit of U.S. Provisional Patent Application No. 62/783,325, filed Dec. 21, 2018, which is incorporated by reference herein in its entirety.

TECHNICAL FIELD

Embodiments described herein generally relate to natural language processing and, in some embodiments, more specifically to an artificial intelligence natural language processing platform.

BACKGROUND

A chatbot may provide automated interaction between a computing device and a user. The user may enter text into a chat user interface and the chatbot may provide a response in the chat user interface. The response provided by the chatbot may be based on keywords identified in the text entered by the user and a script provided to the chatbot. The interaction with the chatbot may assist the user in completing a task.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Chatbots may be used in a variety of user interaction channels. For example, a user may interact with a technical support interactive voice response (IVR) chatbot and a web-based account management chatbot. The technical support chatbot and the account management chatbot may be independently configured resulting in variable user experience between the channels. This may lead to confusion and result in negative user experiences. Traditional chatbots may have a closed architecture that makes them difficult to extend or integrate with other natural language processing (NLP) components.

The systems and techniques discussed herein provide a similar user experience across channels by providing dynamic content integration in a dialogue flow at design time. The systems and techniques provide plug and play connectivity to a variety of natural language processing (NIT) engines and create holistic context using customer conversation history across channels. The design-time configuration of dialogue flow allows a variety of third-party chatbot components to be extended and integrated with other NLP components.

The artificial intelligence natural language processing platform discussed herein provides training modules that connect to chatbot component application programming interfaces (APIs) at design-time and use responses from the APIs within the dialogue flow. Design-time API configuration may reduce the amount of code generated to establish a connection with the chatbot component and may increase processing speed by reducing code generation and compiling at run-time. The artificial intelligence natural language processing platform is developed with loosely coupled architecture that allows plug and play connectivity with a variety of different NLP platforms. Thus, the platform may be vendor agnostic allowing for more flexible component selection and a wider range of configuration options. For example, a first NLP vendor may have a component that excels at processing language in a first domain and a second vendor may have a component that excels at processing language in a second domain. The artificial intelligence natural language processing platform may allow both components to be configured for processing chat text rather than having to sacrifice precision in one domain or the other.

The artificial intelligence natural language processing platform may support multi-channel integration including integration with, for example, a website, a mobile website, FACEBOOK®, AMAZON ALEXA®, GOGGLE. HOME®, interactive voice response (IVR) systems, short message service (SMS) systems, etc. User chat history may be collated from various channels into a centralized repository. The repository may be referenced in subsequent chatbot interactions to provide enhanced cross-channel customer conversations. For example, a user may begin am interaction via an IVR system and may continue the interaction the interaction via a web-based chatbot. The history from the IVR interaction may be retrieved by the web-based chatbot to provide additional context for the web-based interaction. The flexibility to plug-and-play a variety of chatbot components provides robust multi-language support by allowing a dialogue designer to connect to several language specific (e.g., language optimized, etc.) chatbot components so that a dialogue configuration may provide a similar experience and dialogue flow across multiple languages.

Figure 1:
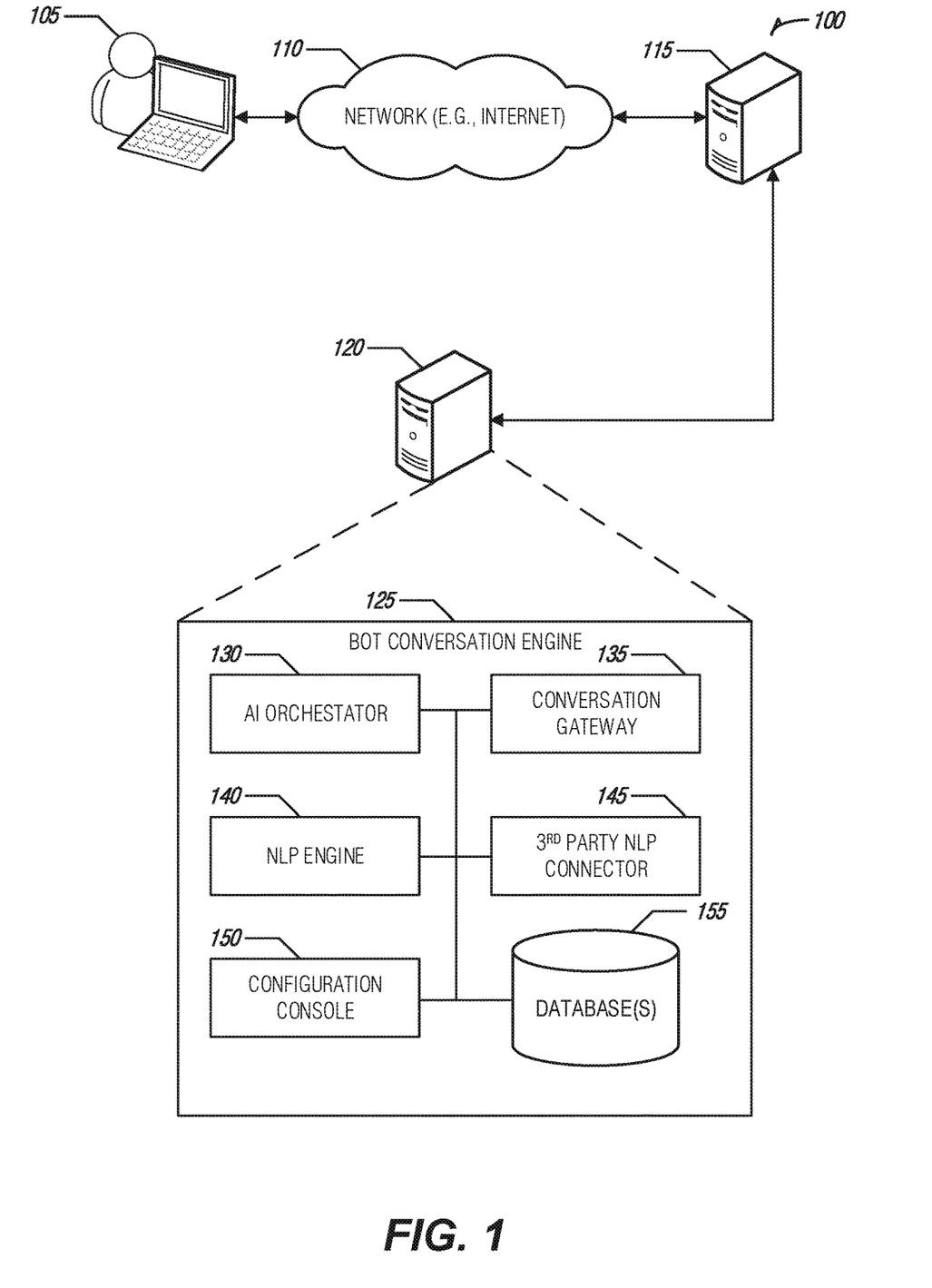
FIG. 1 is a block diagram of an example of an environment and a system for an artificial intelligence natural language processing platform, according to an embodiment.

FIG. 1 is a block diagram of an example of an environment 100 and a system 125 for an artificial intelligence (AI) natural language processing (NLP) platform, according to an embodiment. The environment 100 may include a user 105 interacting with an interactive channel provider 115 via a network 110 (e.g., wired network, wireless network, the internet, a cellular network, etc.). The interactive channel provider 115 may be communicatively coupled (e.g., via a wired network, wireless network, the internet, cellular network, shared bus, etc.) to AI NLP platform service 120 (e.g., a server, a cloud computing platform, a server cluster, etc.). The AI NLP platform service 120 may include the system 125. In an example, the system 125 may be a hot conversation engine. The system 125 may include a variety of components including an AI orchestrator 130, a conversation gateway 135, an NLP engine 140, a third-party NLP connector 145, a configuration console 150, and database(s) 155. The database(s) 155 may include a conversation history database that stores conversation history across channels connected to the AI NLP platform service 120 and an operational database that store operational information such as for example, configuration data, user profile data, connection data, etc.

The user 105 may be interacting with the interactive channel provider 115. For example, the user may be chatting with a chatbot via a chat user interface presented in webpage provided by the interactive channel provider 115. The interactive channel provider 115 may provide chatbot services from the AI NLP platform service 120.

The AI orchestrator 130 may send and receive chatbot messages via the AI NLP platform service 120 that originate and terminate with the interactive channel provider 115. The conversation gateway 135 may obtain a first dialogue configuration ruleset for a first intent for a first entity. Entities as used herein refers to the object of an intended action. For example, entities may include customer accounts, computing systems, organizations, databases, products, services, etc. For example, the user 105 may request a checking account balance and the entity may be account types. The configuration ruleset may include a variety of intents (e.g., the most likely requested action to be performed, etc.) associated with a variety of entities. The configuration rulesets may designate actions (e.g., responses, prompts, workflows, etc.) to be performed when an entity-intent combination is recognized in a chatbot session. The configuration ruleset may be stored in the database 155.

The conversation gateway 135 may receive a first user input including a first text string from a chatbot session. For example, text of the request for the checking account balance may be received. The NLP engine 140 may identify the first intent from the chatbot session by evaluating the first text string using a natural language processing engine and the first dialogue configuration ruleset. For example, the text may include a request for a checking balance and the NLP engine 140 may identify the intent as an account balance inquiry based on the words included in the text, the context of the test, and the like. The NLP engine 140 may use the configuration ruleset to identify available intents and corresponding entities. For example, the entity may be identified as checking account and the intent may be identified as balance inquiry. In an example, the first dialogue configuration ruleset may include at least one of a set of synonyms for the entity, a set of utterances for the intent, and an association between the entity and the intent.

In an example, the natural language processor may be a third-party NLP. The third-party NLP connector 145 may act as a conduit between the NLP engine 140 and a variety of third-party NLP services (not shown in FIG. 1). The third-party NLP services may provide NLP services to the NLP engine 140 that may be used in evaluating received text. The third-party NLP connector 145 may include a variety of API mechanisms that may be used to transmit data between the NLP engine 140 and the third-party NLP services. Functions provided by the third-party NLP connector 145 may include connectivity, data translation, data configuration, data masking, etc. For example, the NLP engine 140 may determine a domain for the received text and may transmit a request to a third-party NLP service for that domain via the third-party NLP connector 145. The response from the third-party NLP service may be used by the NLP engine 140 in processing the received text (e.g., receiving an identified entity and/or intent, verifying an initial evaluation, etc.).

The conversation gateway 135 may generate a dialogue stack for the chatbot session including a first state based on the first dialogue configuration ruleset. In an example, the first state indicates a processing state of the first intent. The dialogue stack may include the intent and a progress indicator for the intent. The progress indicator corresponding to the intent may be updated based on a workflow for the intent included in the dialogue configuration ruleset. For example, a check balance intent may include several steps including identifying the account of which the balance is being requested, returning the balance, and completing the request. The AI orchestrator 130 may provide a first response to the first user input based on the first dialogue configuration ruleset for display by the interactive channel provider 115 to the user 105. The dialogue stack may be updated based on the first response. For example, a list of account identifiers may be presented to the user 105 along with a request for a selection and the status of the intent may be updated to in progress.

In an example, second user input may be received including a second test string from the chatbot session. A second intent may be identified from the chatbot session by evaluating the second text string using the natural language processing engine and a second dialogue configuration ruleset. It may be determined that the second intent is different than the first intent. For example, a user may ask to transfer funds as a first intent and may ask for an account balance while the transfer balance intent is pending. The first state may be updated to indicate that processing of the first intent has been paused. For example, the state of the transfer funds intent may be updated to paused while the account balance inquiry is processed. A second state may be generated for the second intent in the dialogue stack. A second response to the second user input may be displayed using the second dialogue configuration ruleset. The first state and the second state may be updated based on the second response.

In an example, it may be identified that the second state indicates that the intent has completed based on the second response and a prompt may be displayed asking if the user would like to complete the transfer funds intent. Thus, the status of multiple intents may be tracked as the user 105 changes context allowing intents to be resumed without restarting any associated workflows. In an example, the states and associated data may be stored in the database(s) 155 allowing the user 105 to resume a previous intent. Thus, if the user leaves a channel and resumes the intent on another channel, in progress intents may be continued on the current channel. For example, the user 105 may end a web-based chat session and may call into an IVR system to complete the initiated transfer funds intent and the state data may be used to continue the transaction where it left off. For example, the response may be presented to the user via the IVR system using test-to-speech. This provides the user 105 with a uniform interaction (e.g., same prompts, workflow, etc.) across channels.

The configuration console 150 may provide a variety of user interfaces for creating and managing the dialogue configuration ruleset. In an example, a configuration console may be presented to a dialogue designer. The configuration console may include an entity creation user interface, an intent creation user interface, and an instruction user interface. A set of user inputs may be received from the configuration console and the first dialogue configuration ruleset may be generated using the received set of user inputs. In an example, the configuration console may include a design-time application programmer interface (API) configuration user interface element and a connection between the natural language processing engine and the first dialogue configuration ruleset is established using the API configuration user interface. The API configuration user interface may work in conjunction with the third-party API connector 145 to provide API configuration user interface elements for defining API settings during dialogue design. For example, the dialogue designer may be presented with a dropdown box including available API calls based on API definitions configured for the entity-intent pair. When the dialogue designer selects an API call the call may be embedded into an action to be performed for the intent. The API call may be hardcoded to the intent so that it does not need to be calculated at run-time. The design-time configuration of API settings reduces processing at run-time because API settings may not be deter mined and set upon initiation of a connection with a third-party NLP engine because they are already known based on the dialogue configuration ruleset.

Figure 2:
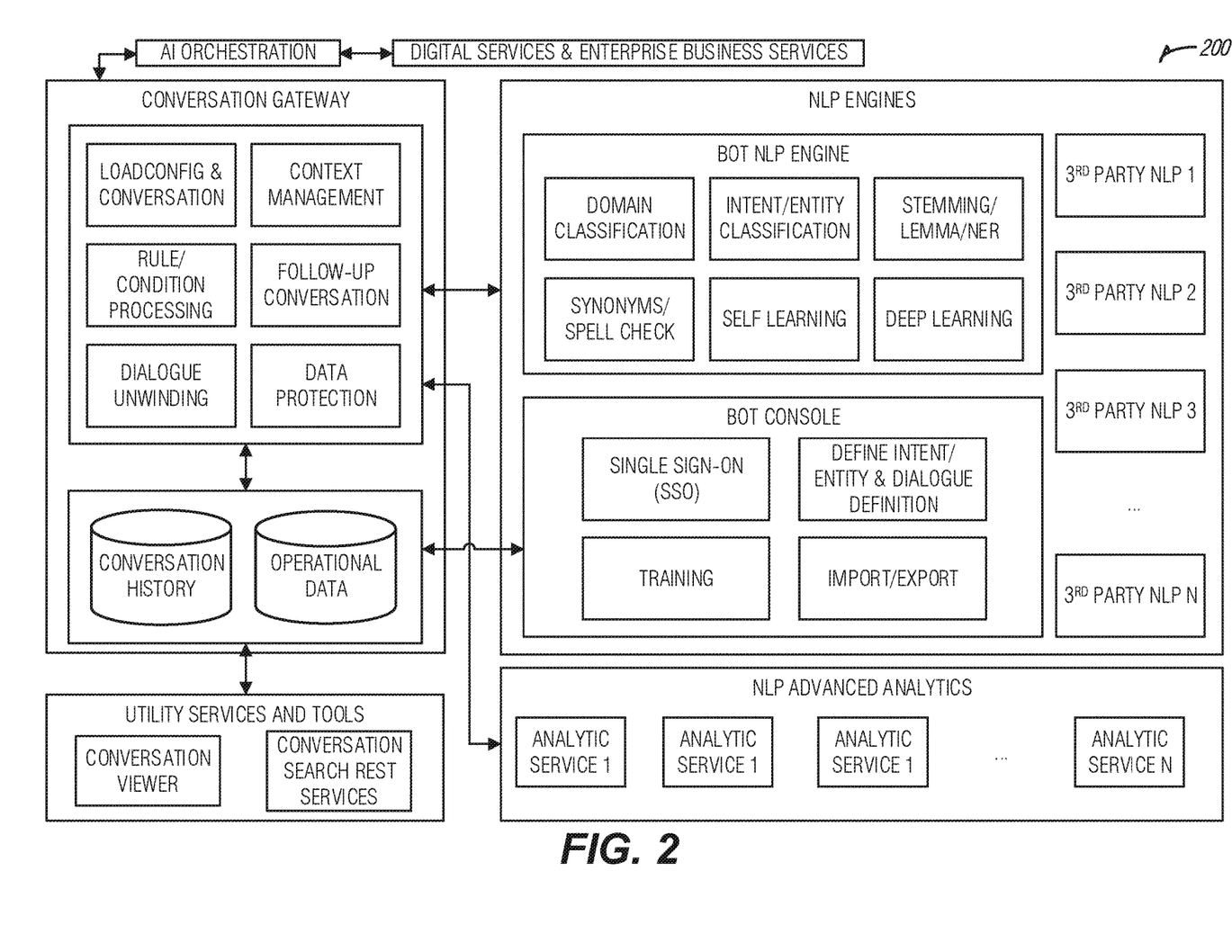
FIG. 2 is a block diagram of an example of a system for an artificial intelligence natural language processing platform, according to an embodiment.

FIG. 2 is a block diagram of an example of a system 200 for an artificial intelligence natural language processing platform, according to an embodiment. The system 200 may provide features as described in FIG. 1. The system 200 may include a variety of components that interact to provide the AI NLP processing platform. The system 200 may include NLP engines including a variety of third-party NLP engines that may be communicatively coupled (e.g., via the third-party NLP connector 145 as described in FIG. 1, etc.) to the system 200 via a conduit such as, for example APIs, communication protocol stacks, and the like. The third-party NLP engines may be trained using training data to generate models for recognizing concepts such as entities and intents in received inputs.

A bot NLP engine (e.g., the NLP engine 140 as described in FIG. 1, etc.) may be included with the system 200. The bot. NLP engine may include a variety of components for evaluating inputs using a variety of machine learning and textual analysis techniques. For example, the bot NLP engine may include a domain classifier component that evaluates inputs and outputs a domain classification. For example, the evaluation of a test string may determine that the text string may be classified as a member of an account management domain. An intent and entity classifier component may evaluate input to identify and output one or more entities and intents included in the inputs. A stemming/lemma/named entity recognition (NER) component may process unstructured text in evaluating inputs to identify and output context and meaning of inputs.

A synonym and spell-checking component may be included with the bot NLP engine to evaluate inputs to correct typographical errors in received inputs and to identify and output synonyms for words included in the received input. The output may be further evaluated by additional components of the system to output entities and intents determined to be included in the input. Self-learning and deep-learning components may be included with the bot NLP engine. The learning components may be provided training data (labeled or unlabeled) that may be processed by the learning components to identify classifications and relationships between input elements and classifications. Models output by the learning components may be used to evaluate the inputs to identify and output entities and intents determined to be included in the input using the models.

A bot console (e.g., the configuration console 150 as described in FIG. 1, etc.) may be included with the NLP engines that provides a variety of user interfaces for configuring and managing the NLP engines. The bot console may include a single sign-on component and user interface for configuring and managing authentication between the various components of the AL NLP processing platform.

A define intent, entity, and dialog component and associated user interfaces may be included that provide a dialogue designer with configuration options for creating and managing intents, entities, and dialogues. The define intent, entity, and dialog component and the associated user interfaces may be used to establish and manage dialogue configuration rulesets. The configuration rulesets may be used to identity intents, entities, and corresponding actions to perform when an entity-intent pair is identified.

A training component and user interface may provide an input mechanism for training the NLP engine components including the bot NLP engine and third-party NLP engines. An import and export component and corresponding user interfaces may provide a mechanism for importing and exporting dialogue configuration rulesets, training data, and other data used by the NLP engines.

A conversation gateway component (e.g., the conversation gateway 135 as described in FIG. 1, etc.) may be included with the AI NLP processing platform that processes conversational dialogue between the NLP engines and an interactive channel provider. The conversation gateway may include a variety of components including a load configuration and conversation component that loads configuration rulesets and manages the conversation between a user and the AI NLP processing platform.

A context management component may identify the context of a chatbot session and may track changes in context to signal other components of the AI NLP processing platform to evaluate inputs to identify if another entity-intent pair is present in received inputs.

A rule and condition processing component may evaluate dialogue configuration rulesets and may use them to provide output responses to the user based on a currently identified entity-intent pair and the inputs received from the user.

A dialogue unwinding component may track the status of intents including when the context has changes and a new entity-intent pair is identified. A follow-up conversation component may provide outputs to the user based on the status of intents identified in the chatbot session.

A data protection component may shield private data from being presented to a user without authentication or from being presented to other components of the system 200 without authorization of the user. The conversation gateway may be communicatively coupled to an AI orchestration component (e.g., the AI orchestrator 130 as described in FIG. 1, etc.) that may act as a conduit providing connectivity between the AI NLP processing platform and a variety of interactive channel providers than may be facilitated through digital services and enterprise business services.

Conversation history and operational databases (e.g., the database(s) 155 as described in FIG. 1, etc.) may be used to store user conversation history and operational data such as dialogue configuration rulesets for use by components of the system 200. The NLP engines, conversation gateway and the databases may be interconnected to provide dataflow among the components of the system 200.

An NLP advanced analytics component may be used to provide analytical information for the AI NLP processing platform. The analytic information may provide information regarding the operation of the AI NLP processing platform including precision and accuracy of the NIP engines.

A utility services and tools component may include a conversation viewer that provides a view of conversations that are occurring (or have occurred) between a user and the AI NLP processing platform. A conversation search rest services component may provide interoperability configuration for services provided by the AI NLP processing platform using representational state transfer (REST).

Figure 3:
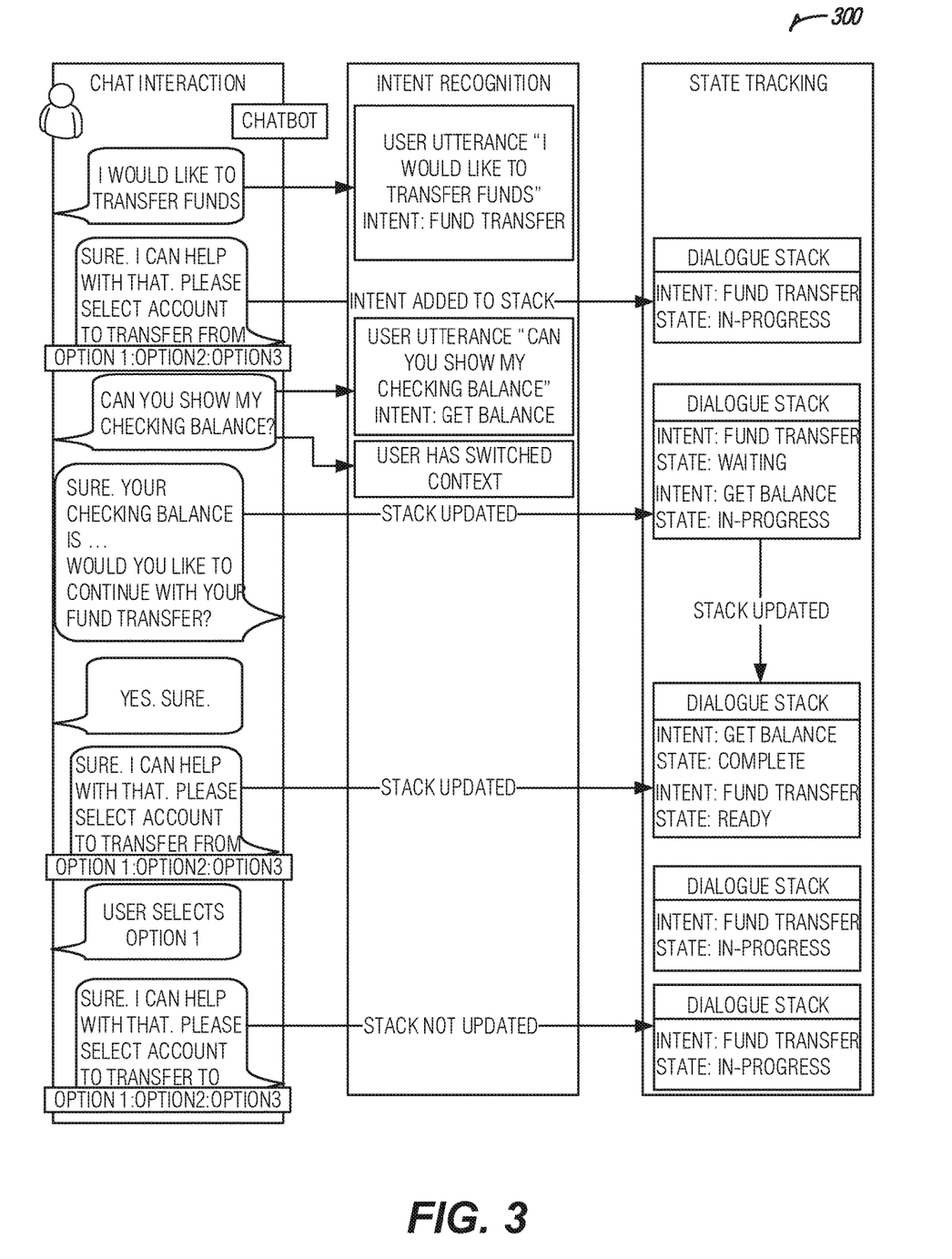
FIG. 3 illustrates an example of a flow diagram for dialogue unwinding in a message flow for an artificial intelligence natural language processing platform, according to an embodiment.

FIG. 3 illustrates an example of a flow diagram 300 for dialogue unwinding in a message flow for an artificial intelligence natural language processing platform, according to an embodiment. The flow diagram 300 may provide features as described in FIGS. 1 & 2. The flow diagram 300 illustrates the flow of state tracking information for various intents identified in a chat interaction between a user and a chatbot.

The user may provide input in a chatbot interface (e.g., web-based interface, IVR interface, etc.) indicating that the user would like to transfer funds. The intent may be recognized (e.g., by the NLP engine 140 as described in FIG. 1, etc.) as "fund transfer." An entity may be determined to be account type and the user may be presented a list of accounts (e.g., by the conversation gateway 135 as described in FIG. 1, etc.) that may be the object of the fund transfer request based on a dialog configuration ruleset for the entity-intent pair(s) identified in the user input. A new dialogue stack may be generated (e.g., by the conversation gateway 135 as described in FIG. 1) including the intent and a status of the intent.

Rather than selecting an option from those presented, the user may request a checking account balance. A new intent "get balance" may be identified in the user input (e.g., by the NLP engine 140 as described in FIG. 1, etc.) and it may be determined (e.g., by the conversation gateway 135 as described in FIG. 1, etc.) that the user has switched context. A response may be provided with a checking account balance of the user and the dialogue stack may be updated to include the get balance intent and a status. The status for the fund transfer intent may also be updated to indicate that the intent is waiting for completion of an intervening intent. The user may be prompted to continue the fund transfer intent and the check balance intent may be updated to complete because the user has been provided with the checking account balance.

The user may indicate that the fund transfer intent should proceed and the user may again be presented with account options as the source of the fund transfer. The dialogue stack may be updated to indicate the fund transfer intent is ready because there are no other intervening intents and the user has indicated a desire to proceed. The user may select an account from the options provided and the dialog stack may be updated to indicate the fund transfer intent is in progress. The user may be presented with options for accounts available as the destination for the fund transfer intent. The dialogue stack may not be updated in this case because the status remains in-progress as additional information has been requested from the user.

The dialogue may continue according to the dialogue rules included in the dialogue configuration ruleset for the fund transfer intent and associated entity. Any intervening intents may be processed as detailed above with the status of any remaining intents being tracked so that processing may continue from the last step of the dialogue process. This allows the user to provide a variety of intents during a chatbot session while the states of individual intents are tracked preventing the user from duplicating inputs or starting an intent over at the beginning of a dialogue process due to context shift during the chatbot session.

Figure 4:
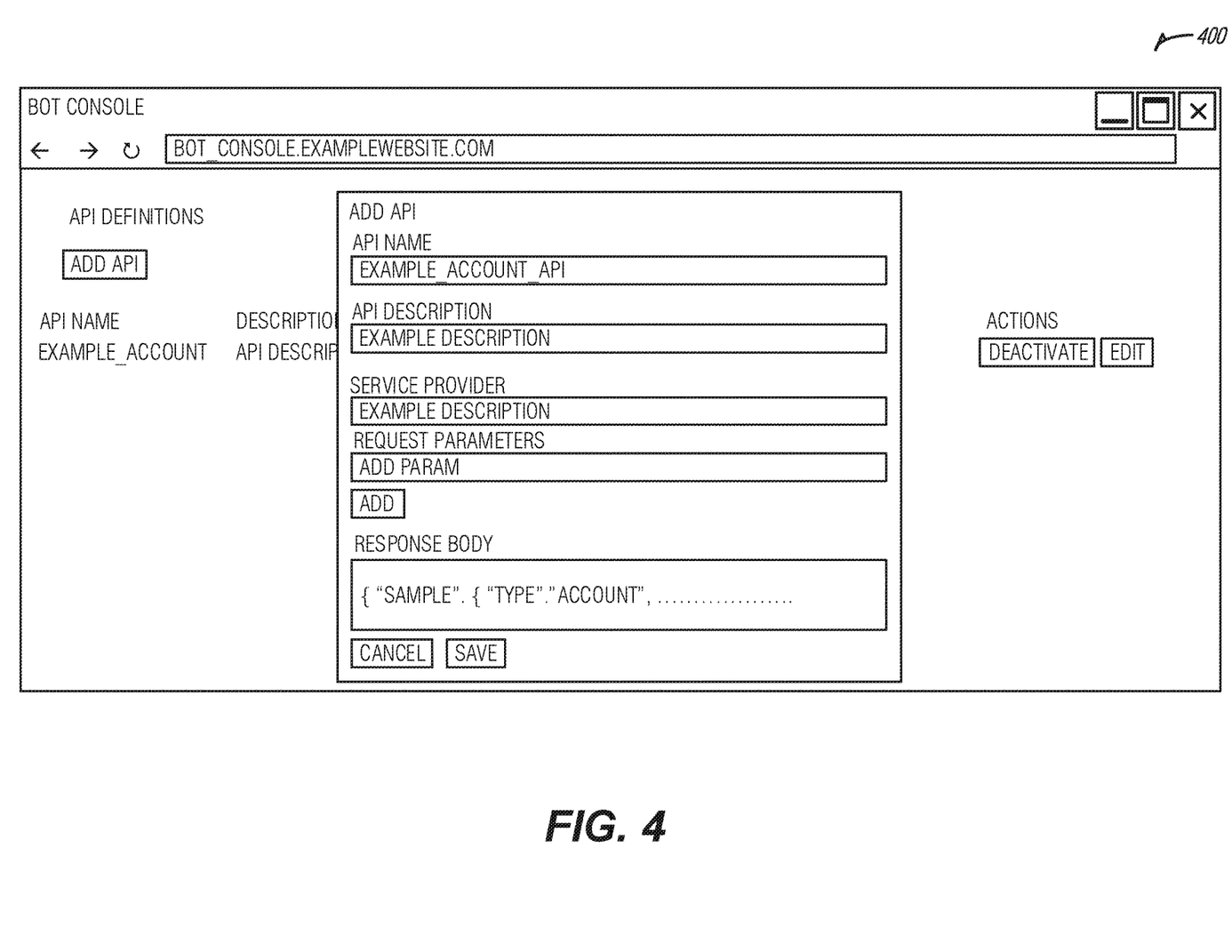
FIG. 4 illustrates an example of an API definition user interface for an artificial intelligence natural language processing platform, according to an embodiment.

FIG. 4 illustrates an example of an API definition user interface 400 for an artificial intelligence natural language processing platform, according to an embodiment. The API definition user interface 400 may provide features as described in FIGS. 1-3. The API definition user interface 400 may include a variety of interactive user interface elements that receive inputs from an administrator (e.g., dialogue designer, etc.) for defining APIs and modifying existing APIs. The user may provide an API name, API description, an API service provider, request parameters, a response body, etc. that define the configuration of an API connection to a third-party NLP engine and other API enabled services.

The configured APIs may enable configuration options in additional user interfaces provided for configuration of dialogue configuration rulesets. For example, a dialogue designer may use an entity creation user interface of the AI NLP processing platform to generate an account type entity. The dialogue designer may provide synonyms for the entity. The dialogue designer may use an intent creation user interface of the AI NLP processing platform to generate a get balance intent. Utterances that may indicate the intent may be provided for the intent. The intent and the entity may then be linked as an entity-intent pair. The dialogue designer may configure actions to be performed for the entity-intent pair. The actions may include responses, operations, API calls, and the like.

The dialogue designer may be presented with a dropdown list of available API calls that may be configured. The dropdown list may be populated based on the API definition created using the API definition user interface 400. For example, the dialogue designer may be able to configure a response to the get balance intent that includes text "Your checking account balance is:" and may select an API call from the dropdown box that returns the checking account balance of the user. When the intent is recognized in a chatbot session, the response may be provided including the text and the account balance.

Figure 5:
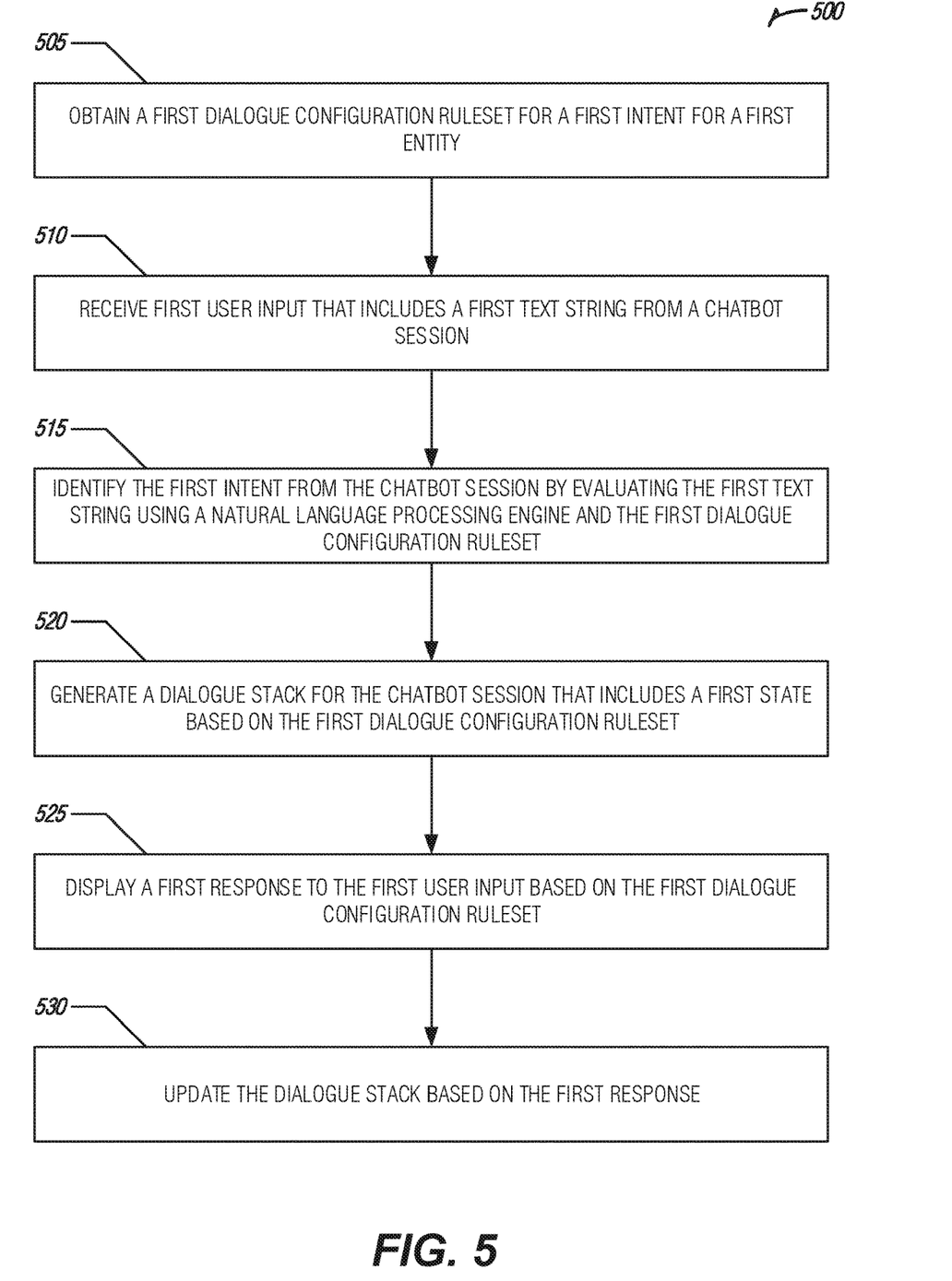
FIG. 5 illustrates an example of a method for an artificial intelligence natural language processing platform, according to an embodiment.

FIG. 5 illustrates an example of a method 500 for an artificial intelligence natural language processing platform, according to an embodiment. The method 500 may provide features as described in FIGS. 1-4.

A first dialogue configuration ruleset may be obtained (e.g., by the conversation gateway 135 as described in FIG. 1 via the AI orchestrator 130 as described in FIG. 1, etc.) for a first intent for a first entity (e.g., at operation 505). In an example, a configuration console may be presented (e.g., by the configuration console 150 as described in FIG. 1, etc.) to a dialogue designer. A set of user inputs may be received from the configuration console and the first dialogue configuration ruleset may be generated (e.g., and stored in the database(s) 155 as described in FIG. 1, etc.) using the received set of user inputs. In an example, the confutation console including an entity creation user interface, an intent creation user interface, and an instruction user interface. In an example, the first dialogue configuration ruleset may include at least one of a set of synonyms for the entity, a set of utterances for the intent, and an association between the entity and the intent.

First user input may be received that includes a first text string from a chatbot session (e.g., at operation 510). The first intent may be identified from the chatbot session by evaluating the first text string using a natural language processing engine (e.g., the NLP engine 140 as described in FIG. 1, etc.) and the first dialogue configuration ruleset (e.g., at operation 515). In an example, the configuration console may include a design-time application programmer interface (API) configuration user interface element and a connection between the natural language processing engine and the first dialogue configuration ruleset is established (e.g., via the third-party NLP connector 145 as described in FIG. 1, etc.) using the API configuration user interface. In an example, the natural language processor may be a third-party natural language processor.

A dialogue stack may be generated (e.g., by the conversation gateway 135 as described in FIG. 1, etc.) for the chatbot session including a first state based on the first dialogue configuration ruleset (e.g., at operation 520). In an example, the first state may indicate a processing state of the first intent. A first response to the first user input may be displayed based on the first dialogue configuration ruleset (e.g., at operation 520). In an example, the response may be displayed in a chatbot session.

The dialogue stack may be updated based on the first response (e.g., at operation 525). In an example, second user input may be received that includes a second text string from the chatbot session. A second intent may be identified from the chatbot session by evaluating the second text string using the natural language processing engine and a second dialogue configuration ruleset. It may be determined that the second intent is different than the first intent. The first state may be updated to indicate that processing of the first intent has been paused. A second state may be generated for the second intent in the dialogue stack. A second response to the second user input may be displayed using the second dialogue configuration ruleset. The first state and the second state may be updated based on the second response. In an example, it may be identified that the second state indicates that the intent has completed based on the second response and a prompt may be displayed to the user to resume the first intent.

Figure 6:
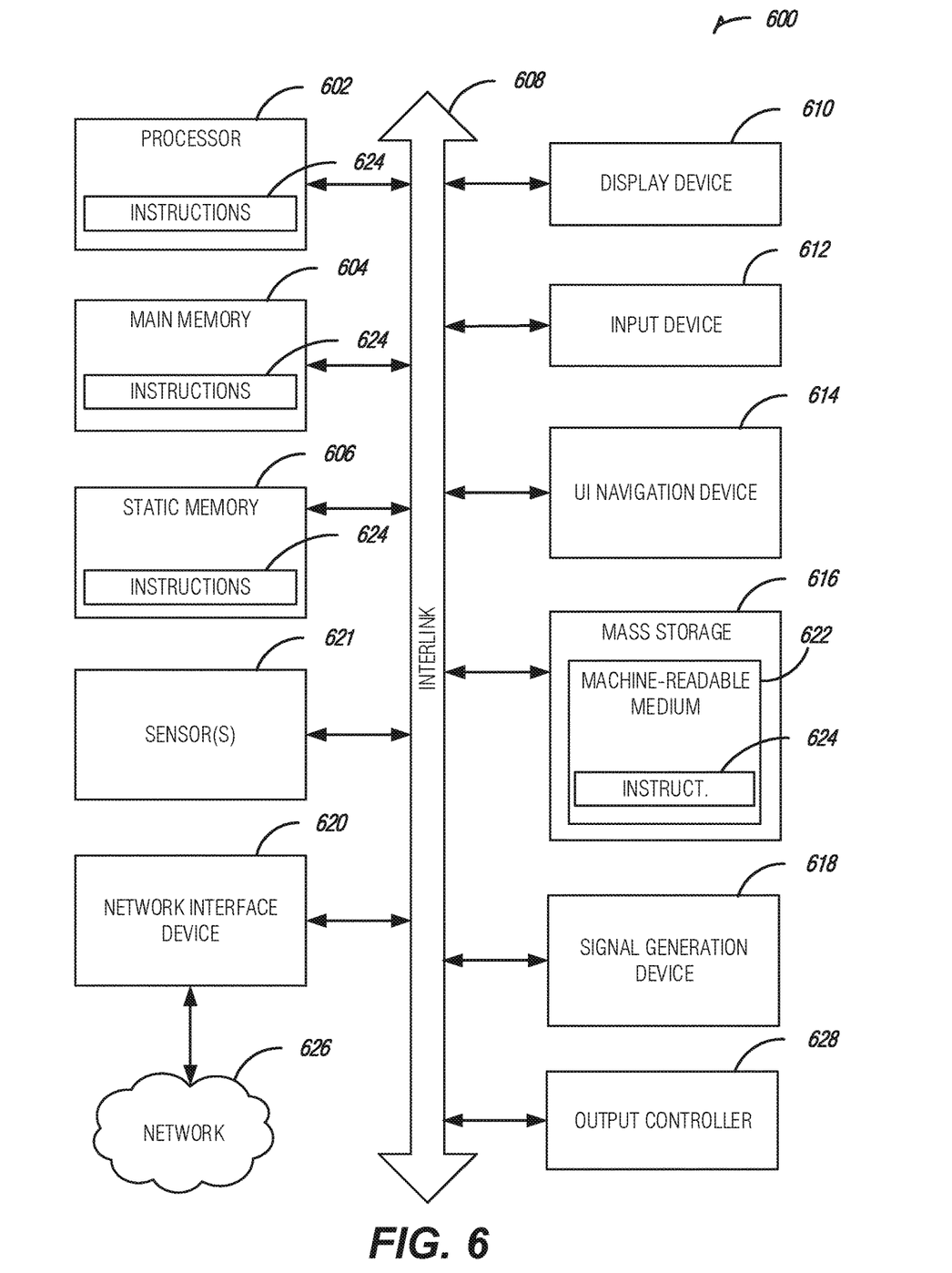
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the teen "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensors. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable media). Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), EE 802.15.4 family of standards, peer-to-peer (P2P) networks, $3^{rd}$ Generation Partnership Project (3GPP) standards for 4G and 5G wireless communication including: 3GPP Long-Tel in evolution (LTE) family of standards, 3GPP LTE Advanced family of standards, 3GPP LTE Advanced Pro family of standards, 3GPP New Radio (NR) family of standards, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (AMMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL NOTES

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is provisionally claimed is:

1. A system for delivering an interactive natural language chatbot session, the system comprising:
   at least one processor; and
   memory including instructions that, when executed by the at least one processor, cause the at least one processor to perform operations to:
      obtain a first dialogue configuration ruleset for a first intent for a first entity;
      receive first user input including a first text string from a chatbot session;
      identify the first intent from the chatbot session through evaluation of the first text string by a natural language processing engine and the first dialogue configuration ruleset;
      generate a dialogue stack for the chatbot session that includes a first state comprising the first intent and a corresponding first progress indicator based on the first dialogue configuration ruleset;
      receive second user input that includes a second text string from the chatbot session;
      identify a second intent from the chatbot session through evaluation of the second text string by the natural language processing engine and a second dialogue configuration ruleset;
      determine that the second intent is different than the first intent;

update the first progress indicator in the dialogue stack to indicate that processing of the first intent has been paused;

generate a second state comprising the second intent and a corresponding second progress indicator based on the second dialogue configuration ruleset in the dialogue stack;

display, in the chatbot session, a second response to the second user input based on the second dialogue configuration ruleset;

update the second progress indicator based on a workflow for the second intent included in the second dialogue configuration ruleset;

send a prompt to continue with the first intent;

determine that there are no intervening intents awaiting completion based on progress indicators within the dialogue stack;

receive an indication to continue with the first intent;

update the first progress indicator to indicate that the first intent is ready based on determining that there are no intervening intents awaiting completion and receiving the indication to continue with the first intent; and update the first state and the second state based on the second response.

2. The system of claim 1, the memory further comprising instructions that cause the at least one processor to perform operations to:

present a configuration console to a dialogue designer, wherein the configuration console includes an entity creation user interface, an intent creation user interface, and an instruction user interface;

receive a set of user inputs from the configuration console; and generate the first dialogue configuration ruleset using the received set of user inputs.

3. The system of claim 2, wherein the configuration console includes a design-time application programmer interface (API) configuration user interface element and a connection between the natural language processing engine and the first dialogue configuration ruleset is established using the API configuration user interface element.

4. The system of claim 1, wherein the natural language processing engine is a third-party natural language processor.

5. The system of claim 1, wherein the first state indicates a processing state of the first intent.

6. The system of claim 1, wherein the first dialogue configuration ruleset includes at least one of a set of synonyms for the entity, a set of utterances for the intent, and an association between the entity and the intent.

7. At least one non-transitory machine-readable medium for instructions for delivering an interactive natural language chatbot session that, when executed by at least one processor, cause the at least one processor to perform operations to:

obtain a first dialogue configuration ruleset for a first intent for a first entity;

receive first user input including a first text string from a chatbot session;

identify the first intent from the chatbot session through evaluation of the first text string by a natural language processing engine and the first dialogue configuration ruleset;

generate a dialogue stack for the chatbot session that includes a first state comprising the first intent and a corresponding first progress indicator based on the first dialogue configuration ruleset;

receive second user input that includes a second text string from the chatbot session;

identify a second intent from the chatbot session through evaluation of the second text string by the natural language processing engine and a second dialogue configuration ruleset;

determine that the second intent is different than the first intent;

update the first progress indicator in the dialogue stack to indicate that processing of the first intent has been paused;

generate a second state comprising the second intent and a corresponding second progress indicator based on the second dialogue configuration ruleset in the dialogue stack;

display, in the chatbot session, a second response to the second user input based on the second dialogue configuration ruleset;

update the second progress indicator based on a workflow for the second intent included in the second dialogue configuration ruleset;

send a prompt to continue with the first intent;

determine that there are no intervening intents awaiting completion based on progress indicators within the dialogue stack, receive an indication to continue with the first intent;

update the first progress indicator to indicate that the first intent is ready based on determining that there are no intervening intents awaiting completion and receiving the indication to continue with the first intent; and update the first state and the second state based on the second response.

8. The at least one non-transitory machine-readable medium of claim 7, further comprising instructions that cause the at least one processor to perform operations to:

present a configuration console to a dialogue designer, wherein the configuration console includes an entity creation user interface, an intent creation user interface, and an instruction user interface;

receive a set of user inputs from the configuration console; and generate the first dialogue configuration ruleset using the received set of user inputs.

9. The at least one non-transitory machine-readable medium of claim 8, wherein the configuration console includes a design-time application programmer interface (API) configuration user interface element and a connection between the natural language processing engine and the first dialogue configuration ruleset is established using the API configuration user interface element.

10. The at least one non-transitory machine-readable medium of claim 7, wherein the natural language processing engine is a third-party natural language processor.

11. The at least one non-transitory machine-readable medium of claim 7, wherein the first state indicates a processing state of the first intent.

12. The at least one non-transitory machine-readable medium of claim 7, wherein the first dialogue configuration ruleset includes at least one of a set of synonyms for the entity, a set of utterances for the intent, and an association between the entity and the intent.

13. A method for delivering an interactive natural language chatbot session, the method comprising:

obtaining a first dialogue configuration ruleset for a first intent for a first entity;

receiving first user input including a first text string from a chatbot session;

identifying the first intent from the chatbot session by evaluating the first text string using a natural language processing engine and the first dialogue configuration ruleset;

generating a dialogue stack for the chatbot session including a first state that comprises the first intent and a corresponding first progress indicator based on the first dialogue configuration ruleset;

receiving second user input that includes a second text string from the chatbot session;

identifying a second intent from the chatbot session through evaluation of the second text string by the natural language processing engine and a second dialogue configuration ruleset;

determining that the second intent is different than the first intent;

updating the first progress indicator in the dialogue stack to indicate that processing of the first intent has been paused;

generating a second state comprising the second intent and a corresponding second progress indicator based on the second dialogue configuration ruleset in the dialogue stack;

displaying, in the chatbot session, a second response to the second user input based on the second dialogue configuration ruleset;

updating the second progress indicator based on a workflow for the second intent included in the second dialogue configuration ruleset;

sending a prompt to continue with the first intent;

determining that there are no intervening intents awaiting completion based on progress indicators within the dialogue stack;

receiving an indication to continue with the first intent;

updating the first progress indicator to indicate that the first intent is ready based on determining that there are no intervening intents awaiting completion and receiving the indication to continue with the first intent; and updating the first state and the second state based on the second response.

14. The method of claim 13, further comprising:

presenting a configuration console to a dialogue designer, the configuration console including an entity creation user interface, an intent creation user interface, and an instruction user interface;

receiving a set of user inputs from the configuration console; and generating the first dialogue configuration ruleset using the received set of user inputs.

15. The method of claim 14, wherein the configuration console includes a design-time application programmer interface (API) configuration user interface element and a connection between the natural language processing engine and the first dialogue configuration ruleset is established using the API configuration user interface element.

16. The method of claim 13, wherein the natural language processing engine is a third-party natural language processor.

17. The method of claim 13; wherein the first state indicates a processing state of the first intent.

18. The method of claim 13, wherein the first dialogue configuration ruleset includes at least one of a set of synonyms for the entity, a set of utterances for the intent, and an association between the entity and the intent.

* * * * *

UNITED STATES PATENT AND TRADEMARK OFFICE
CERTIFICATE OF CORRECTION

PATENT NO. : 11,481,559 B1
APPLICATION NO. : 16/716335
DATED : October 25, 2022
INVENTOR(S) : Asefi et al.

It is certified that error appears in the above-identified patent and that said Letters Patent is hereby corrected as shown below:

In the Claims

In Column 14, Line 25, in Claim 7, delete "stack," and insert --stack;-- therefor In Column 16, Line 27, in Claim 17, delete "claim 13;" and insert --claim 13,-- therefor Signed and Sealed this
Fifteenth Day of August, 2023

Katherine Kelly Vidal
*Director of the United States Patent and Trademark Office*